United States Patent

[11] 3,579,252

[72] Inventor David M. Goodman
3843 Debra Court, Seaford, N.Y. 11783
[21] Appl. No. 491,673
[22] Filed Sept. 30, 1965
[45] Patented May 18, 1971

[54] COMPUTER DRIVEN DISPLAYS EMPLOYING PATTERN RECOGNITION TECHNIQUES
18 Claims, 5 Drawing Figs.

[52] U.S. Cl. 178/7.85, 324/73, 340/149, 350/160
[51] Int. Cl. H04n 5/72
[50] Field of Search 178/7.85, 7.86, 6.6 (TPR); 340/110, 324.1, 149, 377; 350/160 (P); 88/14 (E); 324/73; 343/5 (MM)

[56] References Cited

UNITED STATES PATENTS

| | | | |
|---|---|---|---|
| 2,679,636 | 5/1954 | Hillyer | 324/73 |
| 3,054,998 | 9/1962 | Cooper | 88/14E |
| 3,196,390 | 7/1965 | Smeltzer | 324/73 |
| 3,302,109 | 1/1967 | Jones | 340/149 |
| 3,345,459 | 10/1967 | Dudley | 178/7.85 |
| 3,346,853 | 10/1967 | Koster | 340/324.1 |
| 3,181,172 | 4/1965 | Boblett | 178/6.6TPR |
| 3,290,546 | 12/1966 | Link | 340/149 |

*Primary Examiner*—Robert L. Richardson
*Assistant Examiner*—Joseph A. Orsino, Jr.

ABSTRACT: Different displays are generated on the face of a color cathode ray tube to provide easy-to-interpret patterns representative of input data. The display may be analyzed by human observers, or by automatic means. The patterns are matrixlike in format. Analogue input data is quantized so that the position and/or color of points in the matrix represent a comparison of the input data to reference data. For testing purposes, the data is quantized into five levels and a different color is assigned to each level. Digital input data is transformed into color bits for visually testing the memory bank of a computer. Test data which varies in time is superimposed on data of fixed format to provide a "Blink" effect when the two sets of data do not match. Parity detectors are used to trigger a camera unit which takes photographs of the display screen when mismatch or out-of-tolerance conditions are detected. One such detector consists of an in-line of assembly of display screen, photochromic screen, and plastic scintillator.

INVENTOR.
DAVID M. GOODMAN
BY A. J. Nydick

INVENTOR.
DAVID M. GOODMAN
BY A. J. Nylick

COMPUTER DRIVEN DISPLAYS EMPLOYING PATTERN RECOGNITION TECHNIQUES

This invention relates to displays which employ pattern recognition techniques. In particular, it relates to a multicolor display for testing the memory section of digital computers.

The techniques of automation have been employed by the electronics industry at an ever increasing rate, beginning in the early 1950's, following the introduction of the Eniac digital computer at the University of Pennsylvania in 1945. These digital techniques have been used by the military with varying degrees of success to solve the information handling problem in command and control, missile launch, surveillance, and fire control systems to name a few. These techniques have also been applied in an attempt to provide adequate maintenance for these types of systems. The extent of these efforts is well documented.

These techniques have also been used for scientific calculations and problem solving, for inventory and accounting purposes, and in the process control industry.

The most recent innovations in the application of digital computers involves time sharing of the central computer with users at a number of remote locations. This has been brought about by user requirements and also by the increasing cost of the large capacity, high speed computer itself.

An obvious and immediate consequence of this proliferation of use, and complexity, of the central processor has been the growth in requirements for computer "programmers," and for more suitable input-output devices to improve the methods of communicating with the computer. Another growing requirement is for improved methods of test, display, and recording of the operational status of the computer. Naturally, the larger the computer the more important this last feature becomes. Furthermore, with multiple users it becomes essential to accurately identify and record malfunctions. Otherwise, a user at one remote station may upset the data bank and storage media being used by many other operators.

Accordingly, it is an object of this invention to provide realtime cathode ray tube displays which present a large quantity of test data in multicolor easy-to-interpret patterns; and to provide in conjunction with the CRT display a record-keeping device which operates to retain test data which is generated when a system under test develops a malfunction or out-of-tolerance condition; and to provide in handbook form an information storage facility which contains a library of prerecorded failure patterns representative of specific malfunctions that may occur in the system under test.

Another object of this invention is to test the memory portion of computers and computer like devices.

The manner in which the foregoing objectives are achieved is set forth in the following part of the specification, taken in conjunction with the drawings, wherein:

FIG. 1 represents a matrix of 8×12 data points presented on a color cathode ray tube. One of the data points registers a high value and appears in red; another data point registers a low value and appears in green. The other 94 points are within tolerance and therefore appear white.

FIG. 2 represents a sectional view of a cathode ray tube with two separate optical ports. Adjacent the upper port is a camera for taking pictures of the rear of the target screen. Adjacent the lower port is an optical projector for casting an image on the target screen. The projected image is viewed from the front of the CRT.

Figure 1:
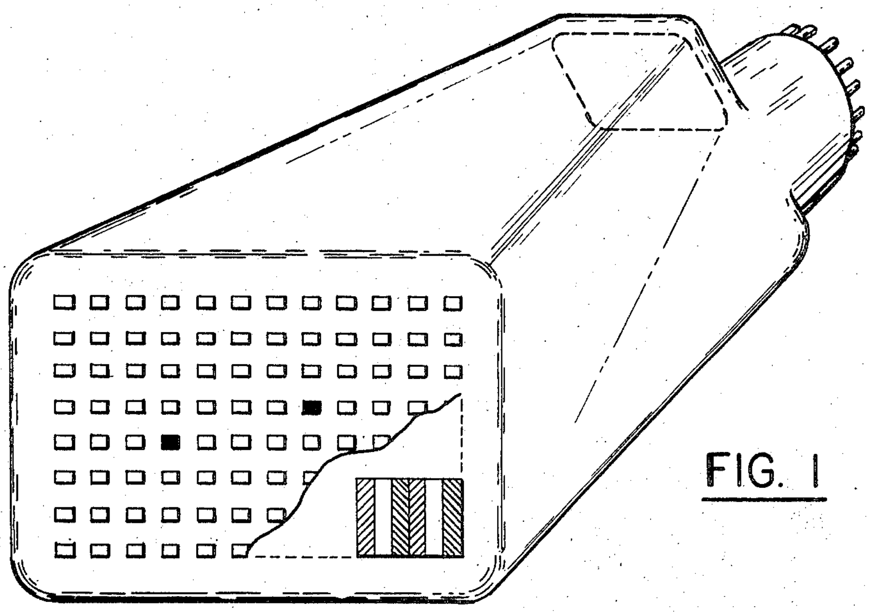

In FIG. 1, a display is illustrated in which test data derived from 96 test points is presented as luminous spots in the form of an 8×12 matrix of white dots. As long as there is no failure, the appearance of the 8×12 matrix of white dots remains uniform and unchanged.

One method of deriving the test data is described in my copending application Ser. No. 119,221 filed June 23, 1961, now U.S. Pat. No. 3,315,160 granted Apr. 18, 1967 which is incorporated herein by reference. Accordingly, it may be considered that the circuits which measure the data operate to route 96 test voltages into five different channels according to the magnitude of the test voltage. The channels are divided into voltage levels of 0—0.7, 0.7—0.9, 0.9—1.1, 1.1—1.3 and over 1.3. By definition, a normal test voltage is in the range 0.9—1.1 volts. A low-marginal voltage is in the range 0.7—0.9 volts; high-marginal voltage is in the range 1.1—1.3 volts. One failure voltage (low) is less than 0.7 volts; and the other failure voltage (high) is greater than 1.3 volts.

The five channels feed into selection networks which control the color of the dots generated on the display. Typically, a test voltage in channel 1 generates a red dot; channel 2, an orange dot; channel 3, a white dot; channel 4, a yellow dot; and channel 5, a green dot. These color dots are clustered together for each of the 96 test points in the 8×12 matrix. What this display means to an observer thus becomes evident. Suppose a test point has changed color; it is because the test voltage is not normal and it takes but a brief inspection to determine from the actual color of the test point if the drift is marginal, or if there has been a failure. The color also reveals whether the drift is high or low, or if the failure is open circuit or short circuit. These relationships are tabulated here for convenience:

| | Voltage range | Color | Significance |
|---|---|---|---|
| Channel: | | | |
| 1 | <0.7 | Red | "Short" circuit. |
| 2 | 0.7-0.9 | Orange | Marginal-low. |
| 3 | 0.9-1.1 | White | Normal. |
| 4 | 1.1-1.3 | Yellow | Marginal-high. |
| 5 | >1.3 | Green | "Open" circuit. |

A closed circuit television chain may be used to generate the display as set forth in application Ser. No. 119,221. A rectangular raster is scanned at a 60 cycle rate in a standard 525 line format so that each of the 96 test points is measured in sequence and the results displayed 60 times each second. In other words, the voltage from a given test point is examined every 16.6 milliseconds; and the dot on the matrix corresponding to this test point is energized once every 16.6 milliseconds. If the voltage is normal the dot remains white. If the voltage is not normal it will be routed into the proper one of the other four channels and the dot will appear as red, orange, yellow, or green. If the voltage drifts through more than one range, then the color of the displayed test point will drift accordingly. If the voltage varies rapidly, as in an intermittent condition, then the dot will flicker in color. Thus, once attracted by an off-normal color the observer can determine after a few seconds of examination if this is an intermittent condition; if it is a drift; or if it is a failure.

FAILURE DIAGNOSIS

When a failure is indicated the observer refers to a previously prepared handbook of test point abnormalities, looks at the entries, and finds the diagnosis for the condition he has observed. This diagnosis can be made in less than a minute, the time it takes to find the entry, if the handbook is complete. To achieve these rapid results the handbook of test point abnormalities obviously was prepared in advance. To do this for 96 individual test points is not very difficult. But suppose, as is often the case, that failures of components do not occur singly but in combinations. Now failure patterns have to be derived for the handbook that take into account the various combinations and permutations of the 96 voltages derived from the test points. Even for only 96 test voltages this can become an excessive burden, especially since each voltage can take on five different effective values. A more practical method of preparing the handbook is to predict, from the design, the most probable failures and to generate from these (either by calculation or experimentation) a series of different failure patterns. These patterns, representing multiple malfunctions, also become part of the handbook. When a complex failure occurs, the observer has to match these patterns with those actually displayed. This matching process will take more time in the case of multiple malfunction than it did in the case of a single abnormality. But after a history of learning on a display of this sort it can safely be assumed that the observer's skill will increase to the point where he will recognize certain patterns for the often repeated failures; he will not have to refer to the handbook; and so diagnosis again becomes almost instantaneous.

Using the foregoing arrangement it is conceivable, even likely, that on occasion a failure pattern will be generated for which there is no equivalent in the handbook. It is necessary in this situation to trouble shoot the test assembly using any technique then available under the circumstances that prevail. After the failure is thus tracked down, the failure pattern and this new found diagnosis is entered into the handbook. Except for this last step of entering the information in the handbook, this procedure is equivalent to ordinary present day maintenance procedures. And even with respect to this last step, it should be noted that when a technician traces down a fault new to him he stores the information in his mind so that if the failure is repeated he need not go through all the steps of retracing the fault.

SELF-PROGRAMMING

To supplement the handbook and to achieve results similar to that inherent in a thought process, a camera unit is positioned to take photographs of the cathode ray tube illustrated in FIG. 1.

Details on a beam index cathode ray tube, and circuits therefore, that may be used for this purpose are contained in may U.S. Pat. No. 3.081,414 granted Mar. 12, 1963. The target screen preferably is deposited on a transparent NESA coated faceplate to facilitate taking photographs from the rear of the tube.

In a properly functioning system or subassembly thereof, the 96 test points create an 8×12 matrix of white dots which are uniform in disposition as has been stated. For this normal condition there is no need to take any pictures. The information is repetitive and redundant. But when a test point varies from normal, thereby generating a different color, it becomes desirable to record the event and the time occurrence. Accordingly, a photocell detector (not shown) responsive to the drift or failure colors is positioned to face the display screen. The detector is energized when a nonnormal color is displayed thereby to open the shutter of the camera. Preferably the shutter stays open for one full raster scanning cycle, in this case one-sixtieth second. In so doing the camera records (1) the last cycle of information (due to the persistance of the phosphors in the CRT) and (2) the data displayed in the one-sixtieth of a second following the opening of the shutter and (3) either clock time or running time, or both. The shutter is then closed and the film is advanced. If the nonnormal condition persists, the camera is again activated, etc. It is thus that the camera takes a series of pictures in color which yields a permanent history of performance.

By repeating this process, of photographing the display, a handbook is soon compiled which contains the pattern for each possible drift and failure mode. Each new diagnosis which is entered into the handbook should be complete and accurate since the electronic post mortem examinations can be carried out carefully and with precision. This can be done in the laboratory, factory, or in the field.

FAILURE REPORTING

It is a further advantage of the camera arrangement just described that a filmed record has been made showing the status of events for the scanning cycle that preceded the actual failure. This record often will suffice to determine the sequence of stages that the assembly went through as it reached the failure mode. This type of failure identification is best used so that redesign or retrofit of the assembly under test can be better accomplished. Not only will the actual failure be recorded but the original stresses which brought about this condition will be part of the record. In other words, the instant arrangement can provide a good failure reporting system for it identifies the failure as well as the cause of failure, which may originate elsewhere. Additionally, if a given failure is not catastrophic but is due to a gradual deterioration process then the observer of the display will see the onset of drift, he can anticipate the failure, and he can take corrective action in advance of the failure itself. For this purpose, the handbook also is prepared to contain instructions specifying corrective action that may be taken under these circumstances.

INFORMATION-RETRIEVAL AND SELF-TEST

The next step in the development of this test system is to provide the observer with mechanical assistance in sorting through the different failure patterns in his handbook. To aid in this information-retrieval process, each of the 96 points in the 8×12 matrix is provided with a circuit controlling relay. Thus, test point 37 has its associated relay 37. This relay is energized only when one of the four nonnormal voltages appear at the test point. This relay functions to select the failure cards which are punched with a hole at position 37. These cards may be of the type conventionally used in machine accounting systems, or they may be designed specifically for the test system. In either case, the details of punching, collating, and sorting are believed sufficiently well known so that this brief reference thereto suffices for the purposes now at hand. Position 37 is punched on four cards, with one card and one hole corresponding to each of the four nonnormal voltages. When relay 37 is energized all the cards with a hole at position 37 are sorted from the deck. The cards are then sorted as a consequence of the test voltage being in either of channels 1, 2, 4, or 5. Likewise if test points other than 37 were off normal, their cards too would be removed from the deck; and there would be a further selection which takes into account the passage of the test signal through channels 1, 2, 4, or 5. Written, typed or printed on each card is a description of the component which caused the drift (or malfunction) together with a description of the adjustment (or repair) which is to be made. Additionally, each card carries a first photographic film transparency with this same descriptive information; and a second photographic transparency which contains the multicolor drift or failure pattern.

Figure 2:
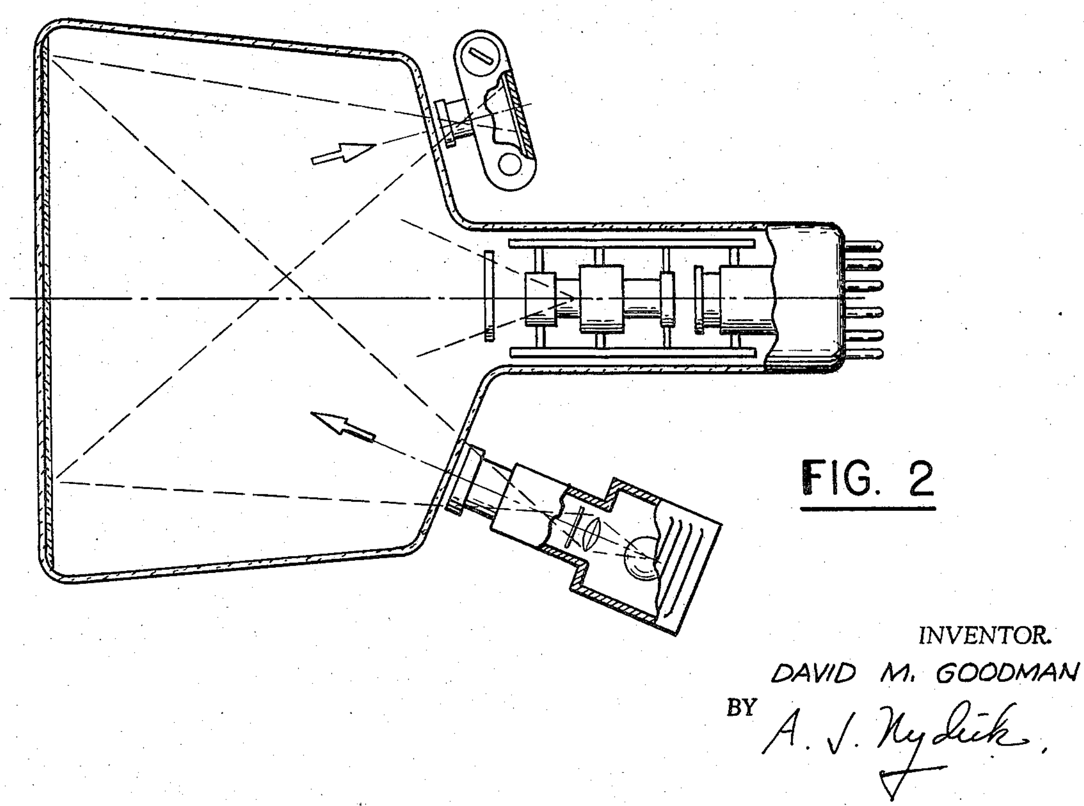

In response to the operation of the photocell detector, a transport mechanism inserts the appropriate failure card 37 (due to operation of relay 37) into the optical projector which is positioned towards the rear of the display CRT as illustrated in FIG. 2. The information on the photographic transparency thus is projected onto the rear face of the CRT. Therefore, the operator who is observing the realtime test data also sees the descriptive information together with the failure pattern stored on the two film transparencies. On one section of the CRT set aside for the projection of the first transparency, there appears the English language instruction or description of malfunction. An aural or visible alarm or message may accompany this projection of the data to make sure that the observer's attention has been drawn to the display. Simultaneously, the failure pattern recorded on the second transparency is projected for viewing by the observer. In this case, however, the failure pattern recorded on the film is not projected on a special portion of the CRT but is projected to be superimposed over the 8×12 matrix of test points as illustrated in FIG.

Figure 3:
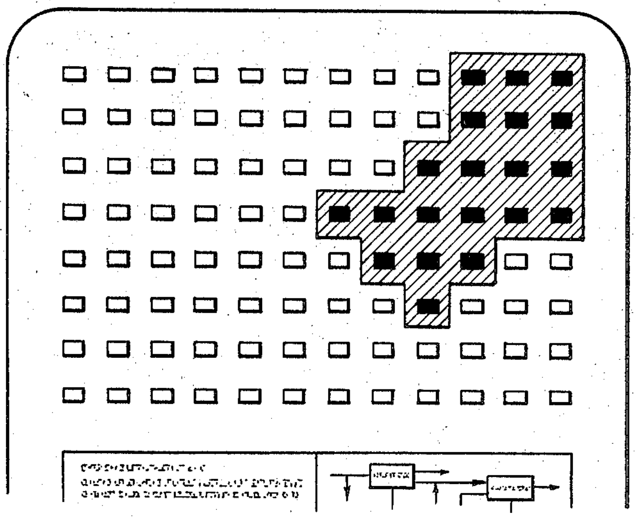
FIG. 3 represents an example of multiple failure in a complex system. A proper diagnosis has been made of the fault inasmuch as the photographic display is in proper register with the electronic display.

3. This is done so that the observer can match the failure pattern generated by the test system with that stored on the film, thereby to verify that the proper failure card has been selected. This visual comparison is made on the basis of (1) dot positions in the matrix and (2) the color of the dot at each position. This is a form of self-test of the Test System which can be "eyeballed" by the observer with relative ease. When a complex fault occurs involving more than a single component a number of relays will be energized. To retrieve the proper failure card a series of card sorting operations commence. The first pass selects all possible faults associated with one of the nonnormal test points. The second pass takes into consideration all possible faults collected from the first pass, and selects only those cards which have a fault associated with the second nonnormal test point. This selection process continues until only the failure card remains whose pattern matches that generated by the assembly under test. The two photographic transparencies on that card then are projected for viewing by the observer. This is also illustrated in FIG. 3 where the concept of pattern recognition is illustrated.

SUMMARY OF THE TEST SYSTEM

The observer so far has been given a test system in which any drift, intermittent, or failure in the assembly under test shows up as a "color flag" in a matrix of white dots which are displayed on a televisionlike receiver. To determine the significance of this "flag" the observer may rely on his memory, may refer to his handbook, or he may read the information from the display screen itself. Perhaps most important, he knows that the matrixlike failure pattern in his handbook is also projected on the face of the CRT to overlay that generated by the electron beam in real-time. This gives him the opportunity to confirm immediately that the failure card that was selected by the automatic information-retrieval subsystem does in fact yield the failure pattern generated by the faulty assembly. If the two patterns do not match, the observer is put on notice that either of two conditions prevail. First: the retrieval subsystem of some other unit of the test system may not be functioning properly. And, this may be verified by exercising a special subroutine in the information-retrieval unit. Second: the test system may be functioning properly but there may not be a suitable failure card in the library. VARIATIONS is equivalent to a "program-stop" which probably is inherent in any automatic physical system which is designed to make logic decisions. Fortunately, this mismatch of the test patterns is the exception rather than the rule and the possibility of its happening should not detract from the already described substantial gainful results.

VARIATIONS IN THE TEST SYSTEM

A number of extensions of the test system are worthy of mention at this point. First: the test point data, which was generated in DC analogue format, was converted or quantized into five different voltage ranges. These ranges can be reduced to three (HI-GO-LO) or increased to almost any desired extent. Each range or step is presented as a different color in the visible matrix. For a limited number of steps, discrete color producing phosphors are used on the face plate of the CRT. For a substantial number of steps, the plurality of colors are generated more suitably by varying the excitation relative to each other of three different primary color producing phosphors. Thus, instead of using five discrete colors in the display (white being one of the colors) the three primary colors may be used in varying proportions to generate the red, orange, white, yellow, and green colors. This method is increasingly advantageous as the number of quantized levels is increased. Second: instead of using a rear port for optical projection of the data stored on the film transparency, a second electron gun can be incorporated in the CRT to be modulated by the output of a flying spot scanner system which has as its input the same film strip. Third: instead of using punched cards, the failure selection slots and instructional information may be recorded magnetically on cards; or on tape, drums, discs, or cores. Fourth: the scan rate may be altered, or the test system may be time-shared to better suit the needs of testing. Thus, if the assembly under test has a high inertial mechanical or thermal component there may be no need to sample the data 60 times each second. And, fifth: devices other than CRT's can be used for display purposes especially if the rate of data presentation does not require high resolution and high scanning speed.

COLOR SYNCHRONISM

Suppose the 12 different test voltages to be displayed on the first line of the 8×12 matrix are not steady in value, but that they vary at a rate slow in comparison to the sampling time of 16.6 milliseconds. Suppose further that all voltages vary in magnitude at the same rate. Then, the 12 points in the line will change color in synchronism to yield a pleasing visual sensation. This often may be desirable from the observer's point of view, but as the test system is now arranged it will trigger the camera unit. Since the system is functioning properly the camera unit should not be energized, and therefore this line of data will have to be masked from the color-sensitive photocell detector. This can be done by providing suitable gating circuits synchronized with the raster scanning, or it can be done by mechanical masking means. Alternatively, a properly phased reference voltage varying at the same rate as the data can be supplied to the comparison network for these 12 points of test data so that the uniform white matrix of visual data is maintained.

THE BLINK TECHNIQUE

Suppose now that a digital signal, rather than a sampled analogue voltage, is made to control the first line of the matrix. The color of the 12 points in the line will take on a given set of values which are representative of the 12 coded numbers. If the digital signal is repetitive the pattern of the color dots is stationary. This condition is apparent from visual inspection and is meaningful. To better interpret patterns of this type, a scanning raster is generated which may be considered akin to the blink microscope. As is well known from the field of astronomy, the repetitive flashing of two patterns in the field of view of an observer creates an image which enables the observer to detect quite small differences between the two patterns. In this manner, the planet Pluto was discovered after many years of comparing thousands of photographs of the sky.

This principle of the blink technique for pattern comparison is applied to compare two groups of test signals to each other. Thus, by way of example, as assembly under test is arranged to process a digital signal which activates all the components in the assembly. This digital test signal may be the test message "See the quick brown fox jump over the lazy dog's back" often used in teletype systems. The response of the assembly is picked off at some suitable point and is displayed bit by bit across the matrix pattern. When the test signal is made repetitive, and is timed to be in synchronism with the scanning of the raster which generates the matrix pattern, and with a stable response from the assembly under test, a fixed pattern is generated on the display device which is easily recognized. Furthermore, a typical overall response from such an assembly will have the input signals and the output signals identical in character. Under these circumstances, the display is made to generate on the first scanning cycle a pattern representative of the input signal. On the second scanning cycle, the display is made to generate a pattern representative of the output signal. On the third cycle the input signal again controls the pattern, etc. Therefore the observer sees the alternate presentations of the input and output digital data in matrix format. If the input and output signals are identical, signifying proper operation of the equipment under test, the matrix of data reappears with each scan in a smooth and uniform fashion. On the other hand, if there is a lack of correspondence between input and output signals the observer will see a blink or color alternation, at the point in the matrix where the discrepancy exists.

COMPUTER TESTER

A digital computer serves as another example for demonstrating the usefulness of this color blink phenomena. In this case, special test programs are used to exercise the computer. For each programmed exercise a response is obtained from the computer which is compared to a predetermined response. Here again, the two responses are compared on a bit-by-bit basis across and down the matrix on the CRT display. Both the program and the correct response may be stored in the memory section of the computer, be it on magnetic drum, disc, core, or delay line. The test sequence and the response thereto is programmed from this memory section in synchronism with the CRT raster scanning cycle to provide a stationary pattern. On the first scanning cycle, the measured response is displayed; on the next cycle the "calculated" response is displayed; and so forth. Therefore, a discrepancy between the measured response and the predetermined response shows up as a color blink on the face of the CRT at each point in the matrix where a discrepancy exists.

To cite an example, let the digital data be in such format that a "yes" or 1 bit is displayed on a CRT as a green dot; and that a "no" or 0 bit is displayed as a red dot. These dots result from the excitation by the electron beam of a green phosphor and a red phosphor, respectively. For convenience in visual comparison, all color dots are produced by phosphors having decay times which are approximately equal. The first line of dots in the matrix is controlled by a first sequence of bits and therefore has a series of green and red color dots. The next row has a second sequence of green and red dots, etc. This display is used in the block diagram of FIG. 4 where an arrangement is shown for checking the memory section of a digital computer. This check can be for maintenance purposes, or it can be used as a programming aide. The scanning of the electron beam on the face of the CRT is synchronized with the scanning of the storage elements on a magnetic drum, a core matrix, or the like. The readout of each bit of data in the storage medium is timed with respect to the CRT scanning so that the CRT displays a matrix of points which corresponds to their positions in memory where the data is stored. This "electronic development" of the surface of the magnetic drum is repeated fast enough so that a steady image is seen by the operator. In between each scan, or each group of scans, of the data in the memory, there is alternately presented an image of the comparison data previously stored on a film chip. Towards this end the raster generated by the flying spot scanner is also synchronized with the rotation of the memory drum. When the pattern of the magnetic drum and that of the film chip is properly matched the display is continuous or even. When there is a discrepancy in the patterns, a blink occurs at the position where the discrepancy exists. This blink may be observed in position, in brightness, and in color variation.

PARITY CHECK

Figures 4, 5:
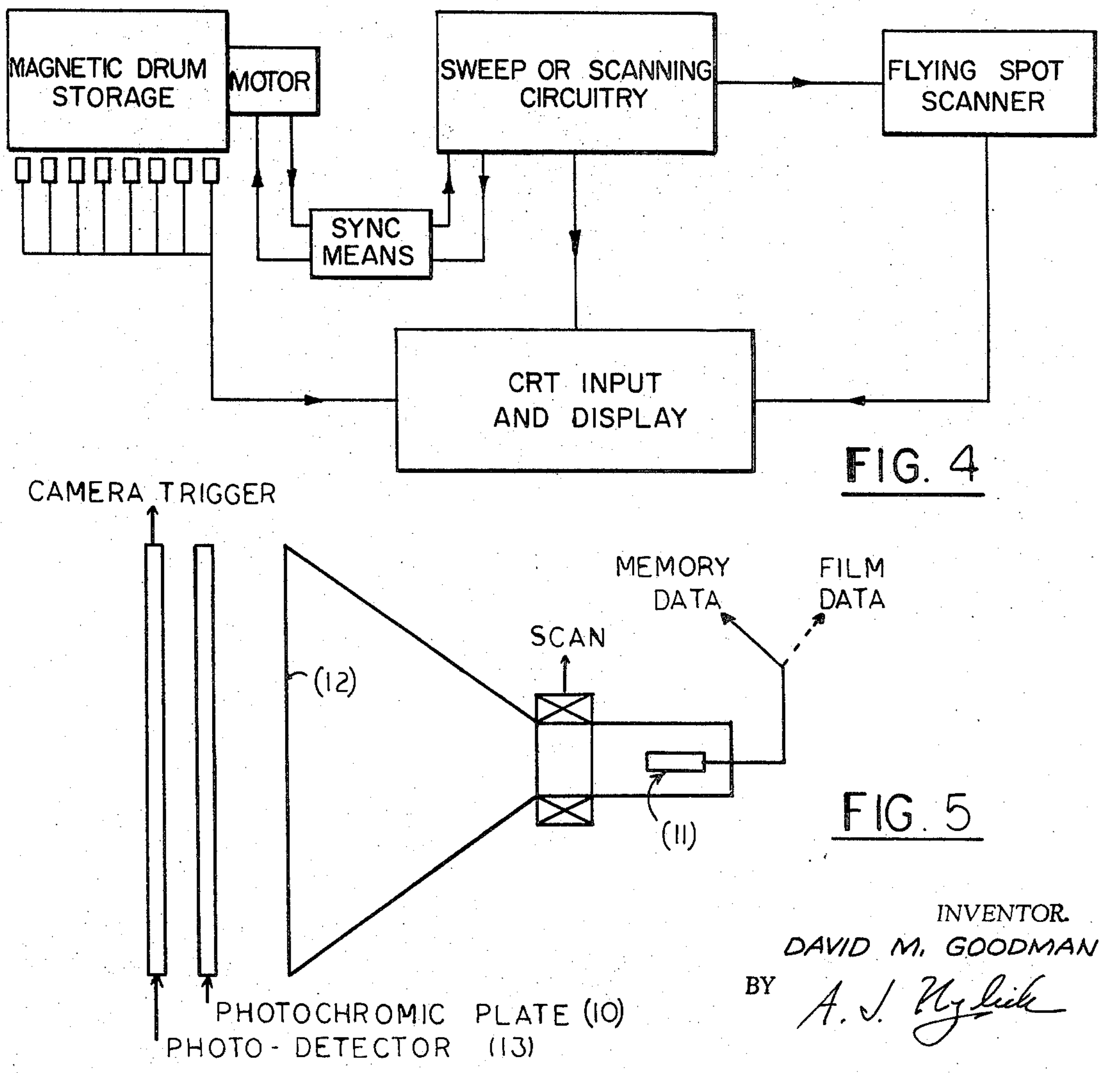
FIG. 4 is a block diagram representing the Blink Technique of Pattern Recognition as applied to the checkout of the memory portion of a digital computer system.
FIG. 5 represents a cross-sectional view of a cathode ray tube, with a display panel, which receives data from two sources. The output of the display panel is transmitted through a photochromic plate to impinge upon a photodetector.

It follows from the preceding description that it would be desirable to photograph the failure patterns in memory as they occur. This can be done by making the trigger of the camera sensitive to line-to-line, block-to-block, or frame-to-frame parity checks using conventional circuitry. Another method of making a parity check is illustrated in FIG. 5 wherein the photochromic plate 10 is exposed, on a first scanning cycle of the electron beam of the CRT, to the data in memory. This memory data modulates the gun 11 of the CRT to imprint its image or pattern on the faceplate 12. This light pattern activates plate 10 to generate discrete areas of opaqueness. On the second scan, the light pattern is generated on the faceplate 12 of the CRT which conforms to the "film" data. When this pattern coincides with that of the memory data, the prior darkening of the photochromic plate 10 will prevent light from being transmitted therethrough. Hence, photodetector 13 will not furnish a trigger signal to the camera unit. Should the two scans generate different images, then light from the CRT faceplate 12 will be transmitted through photochromic plate 10 to illuminate photodetector 13. This will trigger a camera (not shown) to automatically record the discrepancy. Scanning speeds, brightness requirements, and recycling time are all a function of plate 10, characteristics of which are available from the National Cash Register Company, Electronics Division, Hawthorne, Calif. Quoting from their Technical Publication No. 7564 (1964) the properties of plate 10 are described as follows:

By definition, photochromic materials exhibit reversible color changes resulting from exposure to radiant energy in the visible, or near visible portions of the spectrum. For example, one class of photochromic materials consists of light-sensitive organic dyes. NCR photochromic coatings consist of a molecular dispersion of these dyes in a suitable transparent coating material. A photochromic coating can be made to retain two-dimensional patterns or images which are optically transferred to the surface. Photochromic materials can be applied, in general, on the same types of base films as photographic emulsions. In addition, both positive-to-negative and direct-positive transfers are possible. However, photochromic coatings differ from photographic silver-halide emulsions in a number of important respects. The image becomes immediately visible upon exposure and a development process is not required. Further, because the coatings are reversible, the information stored can be optically erased and rewritten repeatedly. In addition, the coatings are completely grain free, have excellent gray scale characteristics, and exhibit inherently high resolution.

Advantageously, the arrangement of FIG. 5 supplements the arrangements in FIGS. 1—4 in that observation of the display by an operator becomes unnecessary. The alarm and recording functions are performed automatically. Another advantage resides in the compact sandwich assembly of the CRT, the photosensitive plate, and the photodetector. A fiber optic faceplate can be used to increase brightness and resolution, and as by contact printing it can be used to excite plate 10. The photodetector can be solid, matrixlike, or it can consist of a plastic scintillator such as NE-102 responsive to the near ultraviolet. The NE-102 scintillator is produced by Nuclear Enterprises and has the property of being transparent to light in the visible range; and is excited internally in response to X-ray and ultraviolet radiation thereby to produce blue-white scintillations. These scintillations are transmitted throughout the NE-102 material and emerge as optical signals at the surface thereof including the edges as depicted by the arrow marked "Camera Trigger" in FIG. 5 of the drawing.

Alternate configurations of FIG. 5 involve (1) the use of Kalvar film (which is responsive to the near ultraviolet and requires no processing) and/or (2) the use of storage-type cathode ray tubes. In either case, the patterns that are generated from an operative assembly can be compared in an autocorrelation mode or in a cross-correlation mode.

Summary

A review of the preceding description will show that the major objectives set forth earlier have been achieved. A multicolor easy-to-interpret pattern of test data has been displayed on a cathode ray tube. The test data which is displayed during a malfunction is retained on photographs taken with color film, or is recorded in some other way. These photographs preferably are taken during the design stages of the prime equipment and are used in the preparation of a handbook, or library, of predicted drift and failure patterns. Experimentation and experience augment this library so that with time it becomes full and complete, even in the presence of design modifications. The information thus stored in the handbook is provided for manual use by a human observer; and that stored in the library is in machine form for use with electromechanical or electronic information-retrieval systems. An example of a punched card information-retrieval system was described which makes searches of the failure patterns, selects failure cards corresponding to faults in the unit under test, and projects the failure patterns upon the CRT so that a comparison may be made between the test data furnished by the unit under test and the prestored data.

A television type CRT display, employing NTSC color signals, generates a rectangular raster pattern of 525 horizontal lines at a 16kc rate. The display can be designed for 400 active horizontal lines with ease. A 20-inch CRT (measured in the horizontal direction) with vertical color strips that are each 40 mils wide provides a vertical resolution of 500 lines. If 450 of these lines are active, and if a three-color arrangement is used for the display of the test data, then 400×450/3 or 60,000 test points can be presented for display. Even with a five-color display of the data, each color having its own vertical color strip, there would be room for 400×450/5 or 36,000 test points. This amount of data is substantial and obviously would be derived from a complex system comprised of many equipments and assemblies. The display of the data is arranged so that different "block" of the matrix correspond to the different equipments, assemblies, or major components making up the system under test. A color change, or a blink, at a single point in this matrix of 60,000 test points will show up as a distinct disturbance in an otherwise regular pattern. Many techniques can be used for investigating this disturbance. The technique described entails the projection of a prerecorded pattern upon the section of the test matrix where the disturbance is located. Another technique might use a second CRT where a blown-up view is presented of the disturbed area. In an extremely large or major system where 600,000 points of test data are being generated, this greater amount of data can be displayed by improving the resolution of the CRT, by using a larger display, and by going to projection type CRT's. *Alternatively, the test patterns may be controlled so that only those that are defective are transmitted for display. This transmission may be to a central monitoring station where it is desired to observe and evaluate the test results of the overall major system.*

I claim:

1. Apparatus comprising: means for receiving a series of digital input signals; first means for generating a display, in a first matrix format, of signals representative of those received; means for storing digital reference signals; second means for generating a display, in a second matrix format, of signals representative of said reference signals; means for superposing the displays of said first and second matrix formats for comparison purposes; including in said first means and said second means additional means for displaying a first digital signal in a first visible color and a different digital signal in a second visible color.

2. The apparatus of claim 1 including a cathode-ray tube having a target screen on which said first matrix format and said second matrix format are superposed, means for automatically generating a trigger signal in response to a mismatch between the patterns yielded by said first and second matrix formats, and means responsive to said trigger signal for taking a photograph in color of said target screen.

3. In combination: a cathode ray tube with a target screen and a faceplate associated therewith; a sheetlike member containing photochromic material abutting said faceplate; a scintillator detector for generating information-bearing optical signals abutting the other side of said sheetlike member; and control means responsive to said optical signals for providing further information-bearing signals; said target screen comprising means to generate and transmit radiation through said faceplate which is capable of darkening said photochromic material, and which in the absence of said darkening is transmitted through the photochromic material in order to excite said scintillator detector, thereby to produce said information-bearing optical signals.

4. The combination of claim 3 including means for exciting the target screen with a scannable electron beam thereby to produce a first pattern of radiation capable of selectively darkening said photochromic material; means to produce in register with the first pattern a second pattern of radiation capable of exciting said scintillator detector, whereby when the first and second patterns do not match the undarkened photochromic material will transmit at least part of the second pattern of radiation in order to excite said scintillator detector; and including means for automatically taking a photograph of the patterns on the target screen in response to an output from said control means.

5. The combination of claim 3 wherein said scintillator detector is sheetlike, and wherein said control means is responsive to optical signals emerging from an edge of the scintillator detector.

6. An optical signal integrating device comprising an optical storage medium having first regions which transmit and second regions which absorb optical radiation; a source of radiation in the optical range; means disposed on one side of said storage medium for directing optical radiation from said source upon said storage medium so as to be selectively transmitted and absorbed by different regions thereof; sheetlike scintillator means disposed on the other side of said storage medium in order to be impinged upon by the optical radiation transmitted through said medium, said scintillator being responsive to the transmitted radiation thereby to generate optical signals; and means responsive to said optical signals for providing a further signal representative of the optical radiation transmitted through said storage medium.

7. The device of claim 6 wherein said sheetlike scintillator is disposed adjacent said optical storage medium.

8. The device of claim 6 wherein the means responsive to the optical signals are disposed to receive the optical signals which emanate from an edge of the scintillator.

9. Apparatus for detecting malfunctions in a digital processing device which is capable of performing a predetermined operation on signals supplied thereto comprising: means for generating a first group of input digital signals; means for applying said first group of signals to said device; means responsive to the output of said device for plotting the digital output signals in a first matrix format; means for generating a second group of reference digital signals representative of the output signals which are to be expected from a normally functioning device; means for plotting said reference signals in a second matrix format; means for superposing said first and second matrix formats for comparison purposes; and wherein said means for plotting the signals comprises a cathode ray tube having an electron gun and a target screen with a plurality of color producing phosphor regions, means for scanning an electron beam furnished by said gun across said regions, and means responsive to the digital output signals for displaying differently valued digital signals in different colors.

10. The apparatus of claim 9 including means for periodically interrupting the plotting of at least one of the two matrix formats thereby to provide a viewable blink effect when the signals plotted in the first matrix and the signals plotted in the second matrix do not match.

11. In a system for analyzing a plurality of variable data inputs: first means for quantizing each of the data inputs into a plurality of discrete level signals; second means for plotting said discrete level signals in a first matrix format; a source of reference data inputs; and third means for comparing the discrete level signals to said reference signals; said third means comprising means for plotting said reference data inputs in a second matrix format and means for superposing said first and second matrix formats for comparison purposes; including means for plotting said discrete level signals so that different discrete levels are plotted in different colors on the matrix format.

12. A system in accordance with claim 11 wherein said source of reference data inputs comprises a photographic storage medium wherein different level signals are stored in different colors in a matrix format.

13. The method of testing the memory section of a digital computer comprising the steps of (1) scanning the memory section to derive signals representative of the information stored at a plurality of memory locations, and (2) scanning in synchronism a display medium, and (3) modulating said display medium to generate a first light pattern in matrix format representative of said stored information, and (4) superposing on said display medium in register with said first light pattern a second light pattern in matrix format representative of another set of stored information; including generating a first color to display a first memory state, and means to generate a second color to display a second memory state.

14. The method of claim 13 including the step of automatically comparing the information stored in said memory section with the other set of stored information, and photographing in color said display medium when the comparison indicates a mismatch between the first and second light patterns.

15. In combination: a primary source of data signals; first means for sequentially sampling said data signals; second means for quantizing the sampled data signals into a plurality of different discrete levels; third means for displaying the sampled data signals in a first matrix pattern format; fourth means for making visually distinct the different discrete levels; and fifth means for superposing a pattern derived from a source of data signals alternate to said primary source of data signals on said first matrix pattern; wherein said fourth means comprises means for displaying different discrete levels in different colors in order to make them visually distinct.

16. The combination of claim 15 wherein said source of data signals alternate to said primary source comprises a photographic storage medium wherein different discrete levels of the data signals are stored in different colors in a matrix format.

17. In a pattern matching apparatus for automatically comparing a first set of optical signals displayable in matrix format with a second set of optical signals displayable in matrix format, the combination comprising: a photochromic screen; means for first projecting said first set of optical signals on said screen to darken selected areas thereof corresponding to high brightness points in the matrix; means for next projecting said second set of optical signals on said screen in a superposed relationship with respect to the first set of signals; optical detection means comprising a sheetlike scintillator disposed in the path of and responsive to said second set of optical signals which are transmitted through the selectively darkened photochromic screen, for providing a trigger signal; and means responsive to said control signal for recording at least one set of the signals being compared.

18. The combination of claim 17 wherein the sheetlike scintillator responsive to the optical signals transmitted through the photochromic screen is disposed adjacent thereto without the use of an intermediate optical relay lens.